(12) United States Patent
Suwabe (10) Patent No.: US 8,799,887 B2
(45) Date of Patent: Aug. 5, 2014

(54) INFORMATION PROCESSING APPARATUS, METHOD FOR CONTROLLING THE SAME, AND STORAGE MEDIUM

(75) Inventor: Takeshi Suwabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 13/172,077

(22) Filed: Jun. 29, 2011

(65) Prior Publication Data

US 2012/0011494 A1  Jan. 12, 2012

(30) Foreign Application Priority Data

Jul. 7, 2010  (JP) ................. 2010-154959

(51) Int. Cl.
  G06F 15/177 (2006.01)
  G06F 12/00 (2006.01)
  H04L 9/32 (2006.01)
  G06F 9/44 (2006.01)
  G06F 9/445 (2006.01)

(52) U.S. Cl.
  USPC ........... 717/169; 709/221; 711/162; 713/172; 717/120; 717/168; 717/170; 717/173; 717/174; 717/171

(58) Field of Classification Search
  None
  See application file for complete search history.

(56) References Cited

U.S. PATENT DOCUMENTS

| | | | | |
|---|---|---|---|---|
| 5,155,837 A | * | 10/1992 | Liu et al. | 709/221 |
| 6,438,749 B1 | * | 8/2002 | Chamberlain | 717/174 |
| 2002/0161890 A1 | * | 10/2002 | Chen | 709/226 |
| 2005/0132179 A1 | * | 6/2005 | Glaum et al. | 713/1 |
| 2005/0188170 A1 | * | 8/2005 | Yamamoto | 711/170 |
| 2005/0289533 A1 | * | 12/2005 | Wang et al. | 717/168 |
| 2007/0169075 A1 | * | 7/2007 | Lill et al. | 717/168 |
| 2008/0155526 A1 | * | 6/2008 | Gokhale | 717/169 |
| 2008/0196019 A1 | * | 8/2008 | Meller et al. | 717/168 |
| 2008/0201702 A1 | * | 8/2008 | Bunn | 717/171 |
| 2008/0222604 A1 | * | 9/2008 | Murphy | 717/120 |
| 2008/0313416 A1 | * | 12/2008 | Frondozo et al. | 711/162 |
| 2008/0320110 A1 | * | 12/2008 | Pathak | 717/173 |
| 2010/0017613 A1 | * | 1/2010 | Chen et al. | 713/172 |
| 2011/0145807 A1 | * | 6/2011 | Molinie et al. | 717/170 |

FOREIGN PATENT DOCUMENTS

| | | |
|---|---|---|
| JP | 2003-263323 A | 9/2003 |
| JP | 2004-42304 A | 2/2004 |
| JP | 2004-094832 A | 3/2004 |
| JP | 2007-052666 A | 3/2007 |
| JP | 2008-084304 A | 4/2008 |

* cited by examiner

*Primary Examiner* — Don Wong
*Assistant Examiner* — Anibal Rivera
(74) *Attorney, Agent, or Firm* — Canon USA, Inc. IP Division (57) ABSTRACT

An apparatus saves first and second programs stored in a storage unit as saved information before the first and the second programs are updated. If the update of the first program is finished and then an error occurs while the second program is being updated, the information processing apparatus restores the second program which is being updated to the program yet to be updated based on the saved information and also restores the first program whose update is finished to the program yet to be updated based on the saved information.

15 Claims, 7 Drawing Sheets

| PROGRAM TO BE UPDATED | VERSION |
|---|---|
| MAIN-PARTITION PROGRAM | 1.0 |
| PROGRAM IN PROCESSING UNIT | 1.0 |
| SUB-PARTITION PROGRAM | 1.0 |

FIG. 6B

| PROGRAM TO BE UPDATED | VERSION |
|---|---|
| MAIN-PARTITION PROGRAM | 2.0 |
| PROGRAM IN PROCESSING UNIT | 1.0 |
| SUB-PARTITION PROGRAM | 1.0 |

FIG. 6C

| PROGRAM TO BE UPDATED | VERSION |
|---|---|
| MAIN-PARTITION PROGRAM | 2.0 |
| PROGRAM IN PROCESSING UNIT | 2.0 |
| SUB-PARTITION PROGRAM | 1.0 |

FIG. 6D

| PROGRAM TO BE UPDATED | VERSION |
|---|---|
| MAIN-PARTITION PROGRAM | 2.0 |
| PROGRAM IN PROCESSING UNIT | 2.0 |
| SUB-PARTITION PROGRAM | 2.0 |

FIG. 7

|  | MAIN-PARTITION PROGRAM | |
|---|---|---|
|  | 1.0 | 2.0 |
| PRINTER UNIT | 1.0/2.0 | 1.0/2.0 |
| SCANNER UNIT | 1.0 | 2.0 |
| USB-FAX UNIT | 1.0 | 2.0 |
| FINISHER UNIT | 1.0/2.0 | 1.0/2.0 |

INFORMATION PROCESSING APPARATUS, METHOD FOR CONTROLLING THE SAME, AND STORAGE MEDIUM

BACKGROUND OF THE INVENTION

1. Field of the Invention

The present invention relates to an information processing apparatus, a method for controlling the same, and a storage medium.

2. Description of the Art

Heretofore, a technique has been known for updating a program executed by an information processing apparatus in an image forming apparatus. Furthermore, a technique has been known in which a program yet to be updated is previously saved in preparation for cases where an error occurs during the update of a program and a defect is found in the updated program itself, and restoration is performed by the saved program in a case where an error occurs.

Still furthermore, a technique has been known in which a combination of the versions of a plurality of programs is managed in updating a plurality of programs executed by the information processing apparatus, and warning is issued if the combination of the versions of a plurality of programs is inappropriate. Japanese Patent Application Laid-Open No. 2004-42304 discusses a technique in which each program included in a plurality of programs is independently updated and it is determined whether a combination of the versions of programs is appropriate after each program is updated.

In Japanese Patent Application Laid-Open No. 2004-42304, however, it is determined whether a combination of the versions of programs is appropriate in a case where the update of each program is normally ended. In other words, the technique discussed in Japanese Patent Application Laid-Open No. 2004-42304 has an issue in that a consideration is not taken into account for the case where an error occurs during the update of each program not to normally end the update.

SUMMARY OF THE INVENTION

According to an aspect of the present invention, an apparatus includes a first storage unit configured to store a first program, a second storage unit configured to store a second program, an acquisition unit configured to acquire update information for updating the first and the second programs, a save unit configured to save the first and the second programs as saved information, an update unit configured to update the first and the second programs based on the update information, and a restoration unit configured to restore the first and the second programs based on the saved information if the update of the first program is successful but the update of the second program is unsuccessful.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following description, the same reference numeral is given to the same components and the description thereof is not repeated herein. Configuration blocks required for the present exemplary embodiment are described first and the processing thereof is described next.

Figure 1:
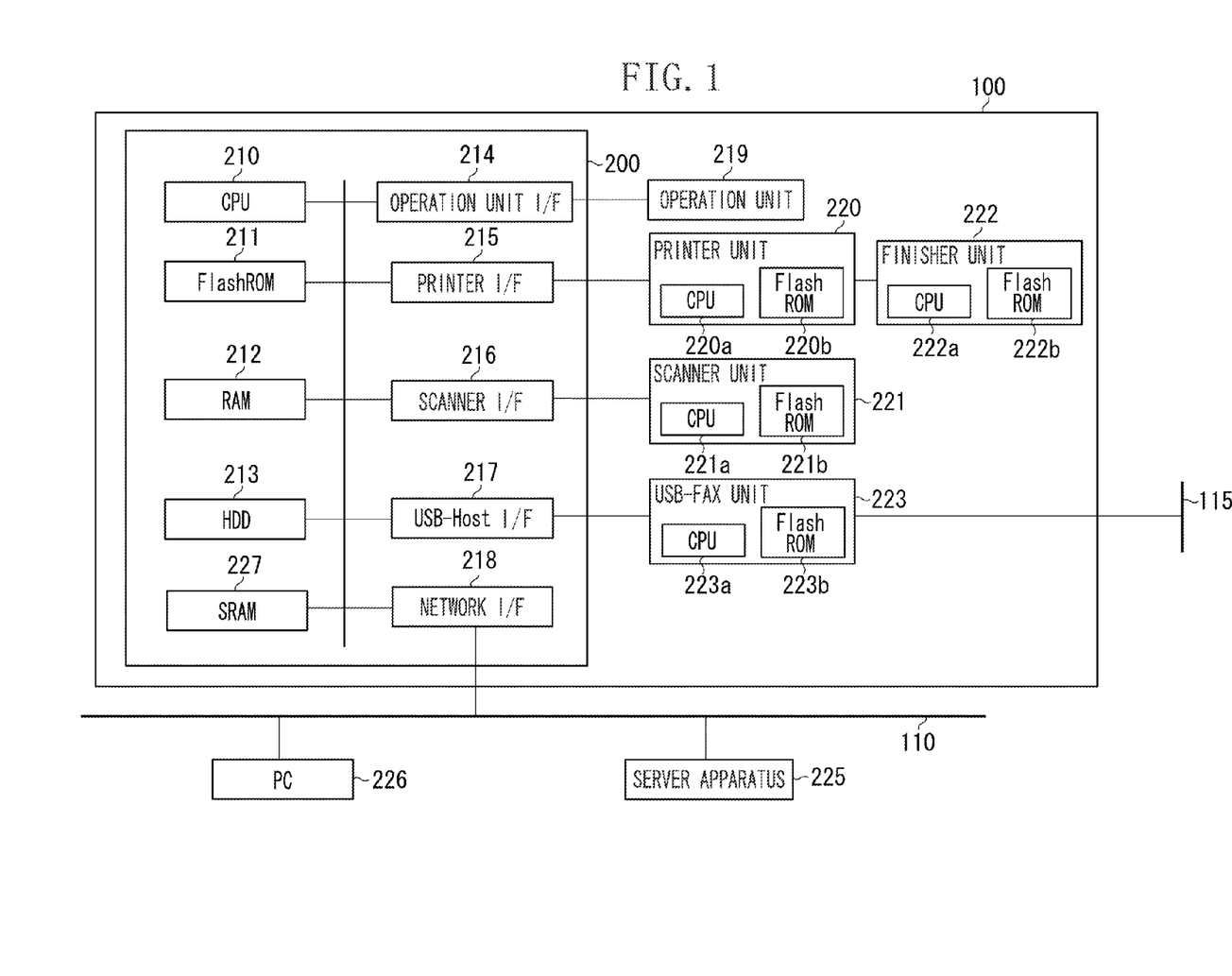
FIG. 1 is a block diagram illustrating a configuration of an information processing apparatus according to an exemplary embodiment of the present invention.

FIG. 1 is a block diagram illustrating a configuration of an information processing apparatus 100.

In FIG. 1, a control unit 200 controls the entire information processing apparatus 100. The control unit 200 being a configuration for controlling the information processing apparatus 100 includes the following.

A CPU 210 reads and executes a program (a first program) for the control unit 200 stored in a flash read-only memory (ROM) 211.

A hard disc drive (HDD) 213 stores print data received from a personal computer (PC) 226 via a network interface (I/F) 218. The program executed by the CPU 210 includes a print application program (described below). The print application program converts the print data stored in the HDD 213 to image data which can be printed by a printer unit 220. The HDD 213 also stores the image data which can be printed by a printer unit 220. The program executed by the CPU 210 includes a scan application program (described below). The scan application program causes a scanner unit 221 to read the image data and the read image data are transferred to the HDD 213. The HDD 213 stores the read image data.

A static random access memory (SRAM) 227 stores information indicating that the information processing apparatus 100 should be started by either a main-partition program or a sub-partition program (described below). If the information indicating that the information processing apparatus 100 should be started by the main-partition program is stored, the SRAM 227 further stores information indicating that the information processing apparatus 100 should be started in either a normal start mode or an update mode for updating the sub-partition program.

An operation unit I/F 214 is an interface for transmitting an instruction input by an operator of the information processing apparatus 100 via an operation unit 219 to the CPU 210. The operation unit I/F 214 receives an instruction from the CPU 210 for changing the contents displayed on the operation unit 219 and transmits the instruction to the operation unit 219.

A printer I/F 215 is an interface for connecting the control unit 200 to a printer unit 220 and a finisher unit 222.

The printer unit 220 performs printing on a sheet based on the image data transferred from the HDD 213 via the printer I/F 215. The printer unit 220 (a printing unit) includes a CPU 220a and a flash ROM 220b. The CPU 220a executes a program (a second program) stored in the flash ROM 220b to cause the printer unit 220 to execute various operations for the print processing.

The finisher unit 222 subjects the sheet on which printing is performed by the printer unit 220 to various types of finishing processes. The finishing process refers to a staple process for a sheet or a punch process (punching) for the sheet, for example. The finisher unit 222 includes a CPU 222a and a flash ROM 222b. The CPU 222a executes a program (a second program) stored in the flash ROM 222b to cause the finisher unit 222 to execute various operations for the finishing process.

A scanner I/F 216 is an interface for connecting the control unit 200 to a scanner unit 221. The scanner unit 221 (an input unit for inputting image data) reads an image on a document as image data using a line sensor formed of a charge coupled device (CCD) and such. The scanner unit 221 transfers the read image data to the HDD 213 via the scanner I/F 216. The image data transferred to and stored in the HDD 213 can be printed by the printer unit 220. The image data read by the scanner unit 221 is printed to allow a copy process. The scanner unit 221 includes a CPU 221a and a flash ROM 221b. The CPU 221a executes a program (a second program) stored in the flash ROM 221b to cause the scanner unit 221 to execute various operations for the scan processing.

A universal serial bus (USB)-Host I/F 217 is an interface for connecting the control unit 200 to a USB-FAX unit 223. The USB-FAX unit 223 sends a facsimile via a FAX line 115 based on the image data transferred from the HDD 213 via the USB-Host I/F 217. The USB-FAX unit 223 generates image data based on data received via the FAX line 115 and transfers the image data to the HDD 213 via the USB-Host I/F 217. The image data stored in the HDD 213 is printed on a sheet by the printer unit 220 as described above. The USB-FAX unit 223 includes a CPU 223a and a flash ROM 223b. The CPU 223a executes a program (a second program) stored in the flash ROM 223b to cause the USB-FAX unit 223 to execute various operations for the facsimile communication processing.

The network I/F 218 connects the control unit 200 to a LAN 110 to communicate the PC 226 and a server apparatus 225 on the LAN 110. The server apparatus 225 stores update information for updating under-mentioned various programs (executed by the information processing apparatus 100) and transmits the update information to the information processing apparatus 100 according to a request from the information processing apparatus 100.

The configuration of a program executed by the CPU 210 of the control unit 200 is described below with reference to FIG. 2.

Figure 2:
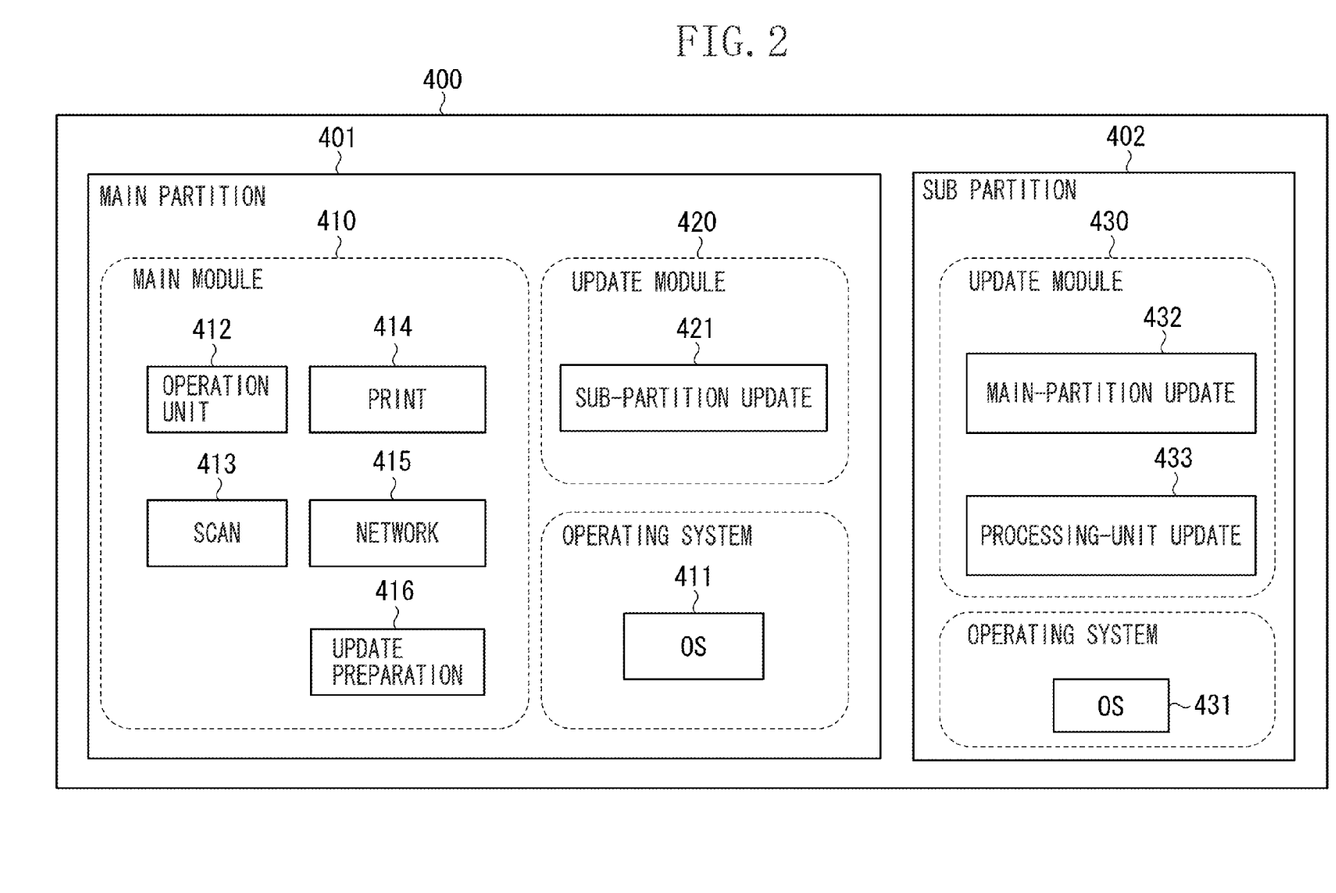
FIG. 2 is a block diagram illustrating a configuration of a program executed by a central processing unit (CPU) of a control unit.

The program illustrated in FIG. 2 is presumed to be stored in the flash ROM 211 in FIG. 1.

The program stored in the flash ROM 211 is separately stored in two partitions on the flash ROM 211; a main partition 401 and a sub partition 402. When the information processing apparatus 100 is caused to perform a normal operation, the CPU 210 is caused to execute an operating system program (hereinafter referred to as OS) stored in the main partition 401. On the other hand, when the program (an undermentioned main module 410) for causing the information processing apparatus 100 to perform the normal operation is updated, the CPU 210 is caused to execute the OS stored in the sub partition 402.

The main partition 401 includes three program modules; an OS 411, the main module 410, and an update module 420. The OS 411 controls the information processing apparatus 100 and includes a driver program for controlling the operation of each unit of the information processing apparatus 100 including the printer unit 220, the scanner unit 221, the finisher unit 222, and the USB-FAX unit 223.

The sub partition 402 includes two program modules; an OS 431 and an update module 430. The OS 431 controls the information processing apparatus 100 and includes a driver program for controlling the operation of each unit of the information processing apparatus 100 including the printer unit 220, the scanner unit 221, the finisher unit 222, and the USB-FAX unit 223. The OS 431 is similar to the OS 411 described above.

The reason the main partition 401 stores two modules in addition to the OS 411 is that each module is selectively executed according to the starting mode of the information processing apparatus 100. More specifically, the CPU 210 executes the OS 411 and each program included in the main module 410 in a normal starting mode in which the information processing apparatus 100 is normally operated. In the normal starting mode, the CPU 210 does not execute the program included in the update module 420. In the update mode in which the program stored in the sub partition 402 is updated, the CPU 210 executes the OS 411 and the program included in the update module 420. In the update mode, the CPU 210 does not execute each program included in the main module 410.

The program modules included in the main module 410 of the main partition 401 are described below. The program modules are application programs executed by the OS 411 after the OS 411 is started.

An operation-unit application program 412 included in the main module 410 transmits instructions input by the operator of the information processing apparatus 100 via the operation unit 219 to the CPU 210 and executes the processing according to the transmitted instructions. A scan application program 413 controls the scan processing by the scanner unit 221. A print application program 414 controls the print processing by the printer unit 220. A network application program 415 is a program for communicating with the PC 226 and the server apparatus 225 on the LAN 110. An update preparation application program 416 is a program for executing a preparation operation for executing the update of the program by the information processing apparatus 100 operating in the normal starting mode.

A sub-partition update 421 included in the update module 420 updates the update module 430 and the OS 431 included in the sub partition 402.

The program modules included in the update module 430 of the sub partition 402 are described below. The program modules are application programs executed by the OS 411 after the OS 411 is started.

A main-partition update 432 is a program for updating the main module 410, the update module 420, and the OS 411 included in the main partition 401. A processing-unit update program 433 is a program for executing the print processing included in the flash ROM 220b and updating the program for executing the scan processing included in the flash ROM 221b. The processing-unit update program 433 is a program for executing the finishing process included in the flash ROM 222b. The processing-unit update program 433 is a program for updating a program for executing the facsimile communication processing included in the flash ROM 223b.

An update processing for a program in the present exemplary embodiment is described below with respect to FIGS. 3 to 5.

Figure 3:
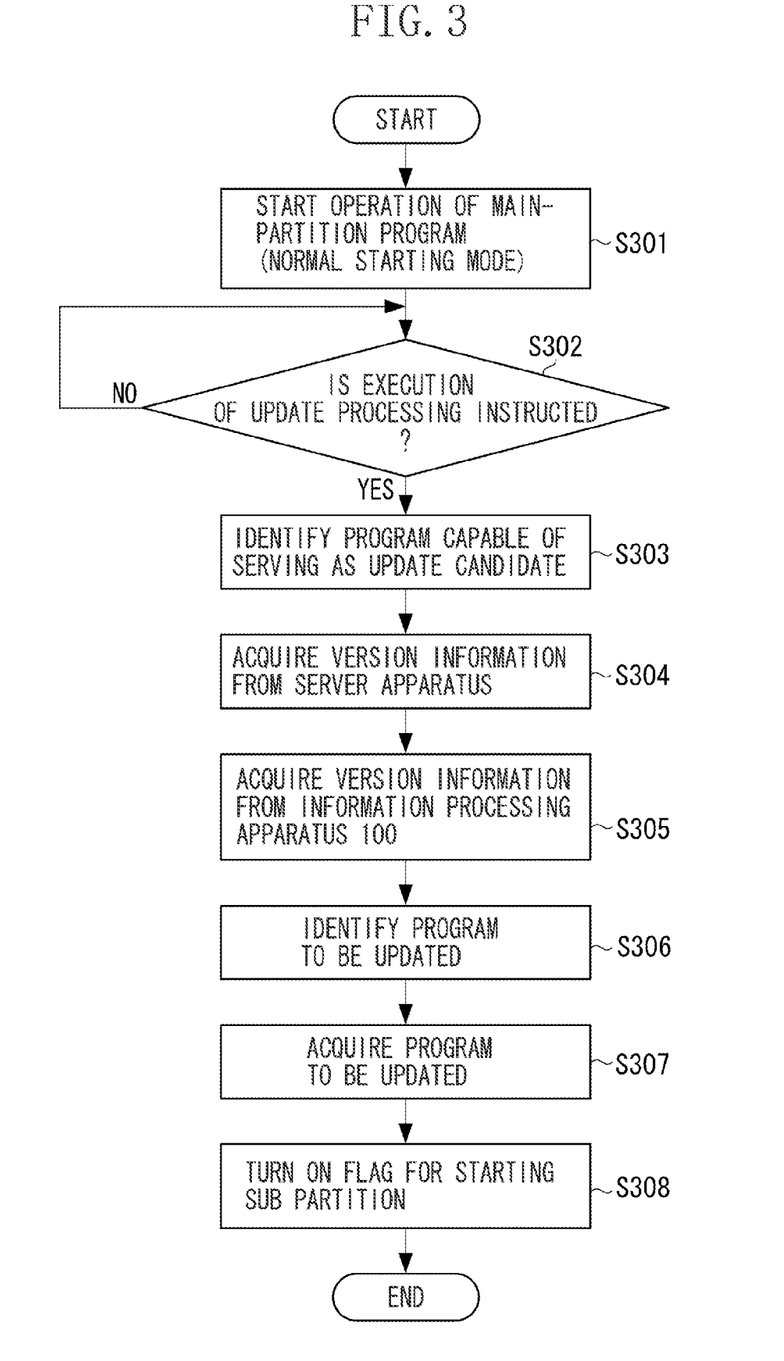
FIG. 3 is a flow chart illustrating processing in a case where the program of a main partition is executed in a normal starting mode.

FIG. 3 is a flow chart illustrating processing in a case where the program of the main partition 401 is executed in the normal starting mode.

Figure 4:
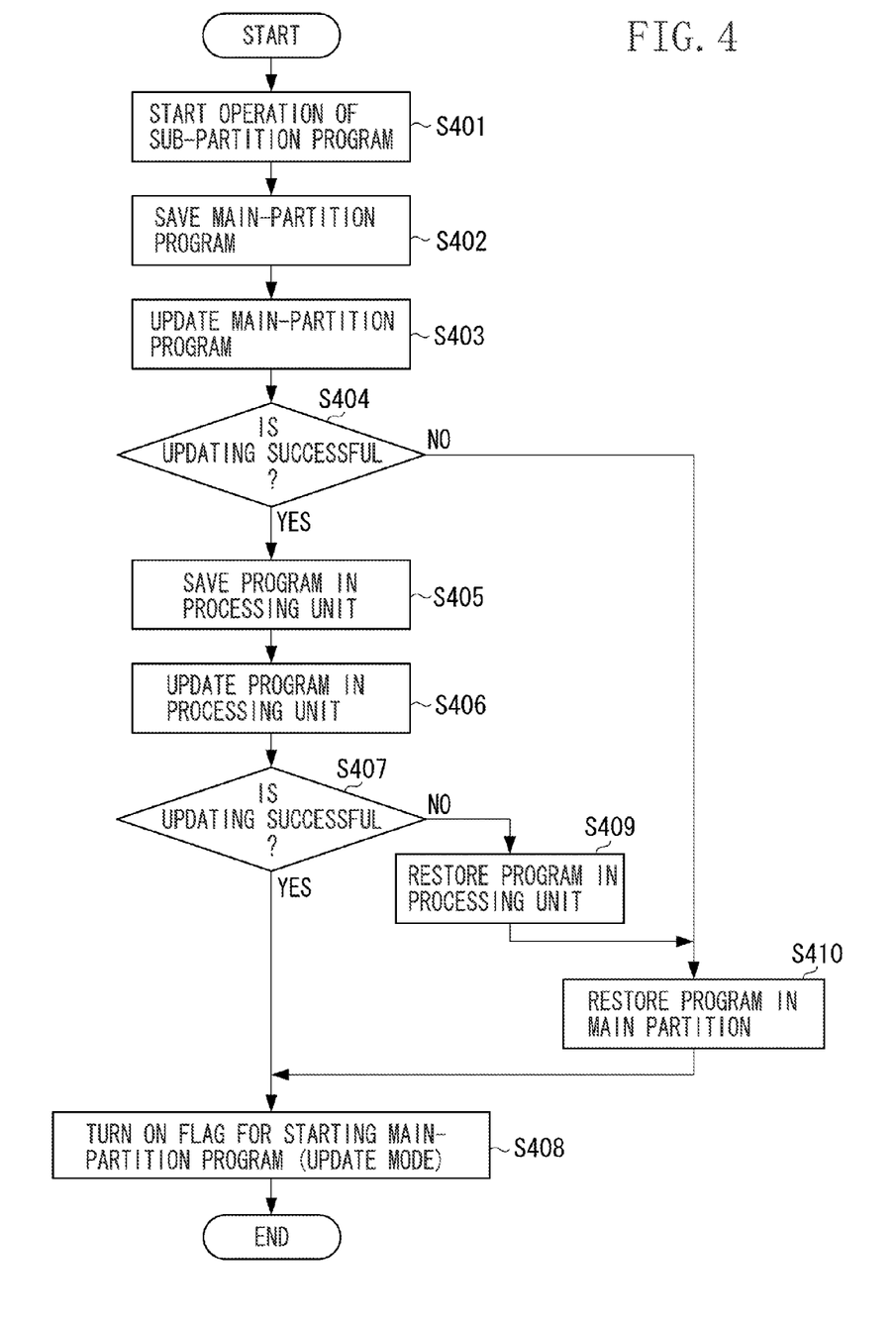
FIG. 4 is a flow chart illustrating processing in a case where the program of a sub partition is executed.

FIG. 4 is a flow chart illustrating processing in a case where the program of the sub partition 402 is executed.

Figure 5:
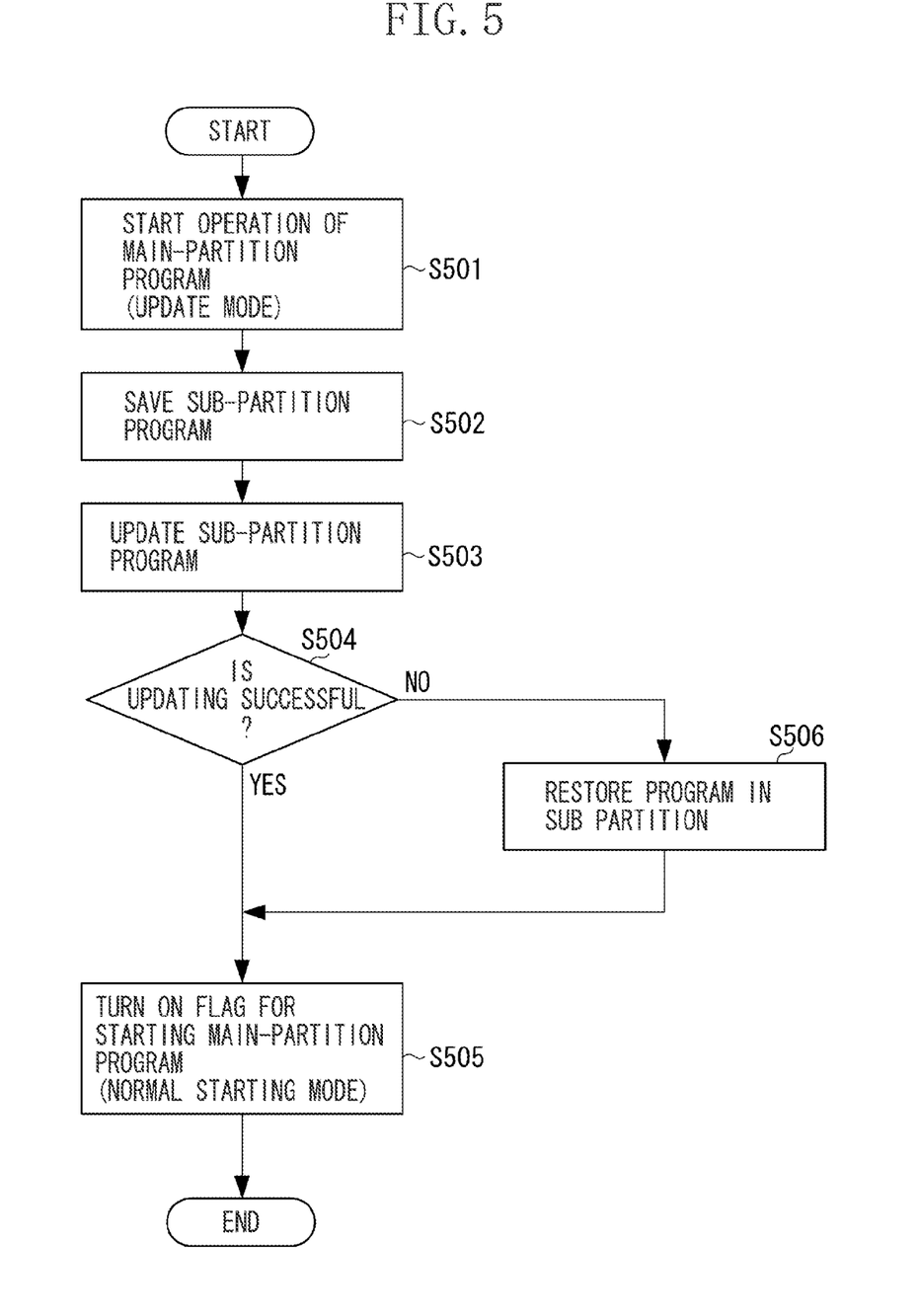
FIG. 5 is a flow chart illustrating processing in a case where the program of the main partition is executed in an update mode.

FIG. 5 is a flow chart illustrating processing in a case where the program of the main partition 401 is executed in the update mode.

The processing in each step in FIGS. 3 to 5 is performed by the CPU 210 of the control unit 200 executing the program stored in the flash ROM 211.

The processing in a case where the program of the main partition 401 is executed in the normal starting mode is described below with reference to FIG. 3.

In step S301, the CPU 210 starts the information processing apparatus 100 in the normal starting mode. More specifically, the CPU 210 starts the OS 411. The started OS 411 executes the program modules included in the main module 410.

In step S302, the CPU 210 determines whether the execution of update processing for updating the program of the information processing apparatus 100 is instructed. If the CPU 210 determines that the execution of the update processing is instructed (YES in step S302), the processing proceeds to step S303. The instructions for executing the update processing refer to those performed by the operator of the information processing apparatus 100, for example, via the operation unit 219. A schedule for periodically updating the program every constant time period (every two weeks, for example) may be previously determined to issue instructions for periodically executing the update processing.

In step S303, the CPU 210 executes the update preparation program 416 via the OS 411 to identify a program capable of serving as an update candidate out of the programs stored in the flash ROM 211 and the flash ROMs 220b to 223b. For example, a display screen for specifying each program is displayed on the operation unit 219 to identify the program specified by the operator via the operation unit 219 as the update candidate. All programs capable of serving as the update candidate may be identified as the update candidate not based on instructions by the operator.

In step S304, the CPU 210 executes the update preparation program 416 and the network application program 415 and transmits a request for acquiring model ID information for identifying the information processing apparatus 100 and version information to the server apparatus 225. The information processing apparatus 100 acquires the version information managed by the server apparatus 225. The term "version information" refers to information indicating the version of each program module included in the main module 410. If the server apparatus 225 receives a request for acquiring the model ID information and the version information from the information processing apparatus 100, the server apparatus 225 identifies the version information corresponding to the model ID and transmits the identified version information to the information processing apparatus 100.

In step S305, the CPU 210 executes the update preparation program 416 to acquire the version information of the information processing apparatus 100. The term "version information of the information processing apparatus 100" refers to information indicating the version of each program stored in the flash ROM 211 and the flash ROMs 220b to 223b.

In step S306, the CPU 210 executes the update preparation program 416 to identify the program to be updated. More specifically, the CPU 210 identifies the program different in the version information between the server apparatus 225 and the information processing apparatus 100 among the programs capable of serving as update candidates identified in step S303. This shows that a program later in version than the information processing apparatus 100 can be downloaded from the server apparatus 225.

In step S307, the CPU 210 acquires the program to be updated (update information) identified in step S305 from the server apparatus 225. More specifically, the information processing apparatus 100 transmits program identification information showing the program to be updated identified in step S306 to the server apparatus 225. If the server apparatus 225 receives the program identification information from the information processing apparatus 100, it transmits the program corresponding to the program identification information to the information processing apparatus 100. The program to be updated received from the server apparatus 225 is stored in the main partition 401 of the flash ROM 211.

In step S308, the CPU 210 executes the update preparation program 416 to store a flag indicating that the program of the sub partition is started at the next startup in order to update the program of the information processing apparatus 100 in the SRAM 227.

Following step S308, the CPU 210 brings the information processing apparatus 100 into a shut-off state where the supply of electric power to each unit of the information processing apparatus 100 is shut off to reboot the information processing apparatus 100.

The processing in a case where the program of the sub partition 402 is executed (the processing for updating the program of the information processing apparatus 100) is described below with reference to FIG. 4.

Each processing in FIG. 4 is started by the power supply of the information processing apparatus 100 being automatically turned on after the processing in FIG. 3 is ended and the information processing apparatus 100 is brought into the shut-off state.

In step S401, the CPU 210 confirms that the flag indicating that the program of the sub partition is started is stored in the SRAM 227, and starts the program of the sub partition.

In step S402, the CPU 210 executes save processing for saving the program stored in the main partition 401 (saved information). More specifically, the save processing is performed by copying all programs stored in the main partition 401 into the sub partition 402. If the sub partition 402 has an insufficient free space, the programs may be saved into the HDD 213. The reason the save processing is performed is that the program of the main partition 401 can be restored to the state before the update is performed if an error occurs during the update processing.

In step S403, the CPU 210 executes the main-partition update program 432 to execute the update processing of each program of the main partition 401.

In step S404, the CPU 210 determines whether the update processing of each program of the main partition 401 is successful. If the CPU 210 determines that the update processing is successful (YES in step S404), the processing proceeds to step S405. If the CPU 210 determines that the update processing is unsuccessful to cause an error (NO in step S404), the processing proceeds to step S410. The reason the update processing becomes unsuccessful to cause the error is that, for example, the update processing is not ended even after a certain time period elapses after the update processing is started.

In step S405, the CPU 210 executes the processing-unit update program 433. The CPU 210 executes the save processing for saving the program stored in the processing units (the printer unit 220, the scanner unit 221, the USB-FAX unit 223, and the finisher unit 222). Specifically, all programs (saved information) stored in each processing unit are copied into the sub partition 402 to save all programs. If the sub partition 402 has an insufficient free space, the programs may be saved into the HDD 213.

In step S406, the CPU 210 executes the processing-unit update program 433 to execute the update processing of the programs executed by the processing units (the printer unit 220, the scanner unit 221, the USB-FAX unit 223, and the finisher unit 222).

In step S407, the CPU 210 determines whether the update processing of the program of each processing unit is successful. If the CPU 210 determines that the update processing is successful (YES in step S407), the processing proceeds to step S408. If the CPU 210 determines that the update processing is unsuccessful to cause an error (NO in step S407), the processing proceeds to step S409. The reason the update processing becomes unsuccessful to cause the error is that, for example, the update processing is not ended even after a certain time period elapses after the update processing is started. In the present exemplary embodiment, the processing unit includes the printer unit 220, the scanner unit 221, the USB-FAX unit 223, and the finisher unit 222. If an error occurs in the update processing of any of the processing units, the CPU 210 determines that the update processing is unsuccessful.

In step S408, the CPU 210 starts the program of the main partition at the next startup to renew the program of the sub partition, storing a flag specifying the start in the update mode into the SRAM 227.

Following step S408, the CPU 210 brings the information processing apparatus 100 into a stop state where the supply of electric power to each unit of the information processing apparatus 100 is shut off to reboot the information processing apparatus 100.

In step S409, the CPU 210 restores the programs (a plurality of sub programs) of each processing unit using the program saved into the sub partition 402 in step S405. More specifically, the program saved into the sub partition 402 is copied into the flash ROMs 220b to 223b of each processing unit to be restored. The reason such a restoration is performed is that the CPU 210 determines that the update processing of the program (the second program) is unsuccessful to cause an error.

In step S410, the CPU 210 restores the programs of the main partition 401 using the program saved into the sub partition 402 in step S402. More specifically, the program saved into the sub partition 402 is copied into the main partition 401 to be restored. The reason such a restoration is performed is that the CPU 210 determines that the update processing of the program is unsuccessful to cause an error in step S404 or step S407.

The restoration of programs in the main partition 401 is executed if the CPU 210 determines that the update processing is unsuccessful in step S407 even if the CPU 210 determines that the update processing of program of the main partition 401 is successful in step S404. The CPU 210 determines that the update processing is unsuccessful in step S407 in a case where the update processing of program of each processing unit is unsuccessful to cause an error. The reason the program of the main partition 401 is restored to the program yet to be updated is due to the following.

That is because a combination of versions of programs of the main partition 401 and each processing unit is made appropriate. For example, if the program of the main partition 401 is upgraded but that of each processing unit is not upgraded, the versions of programs of the main partition 401 and each processing unit are not conformed to each other. In this case, the transfer of data between the control unit 200 and each processing unit, instructions from the control unit 200 to each processing unit, and response thereto are not made appropriately. In the present exemplary embodiment, the program of the main partition 401 is restored to the program yet to be updated not to cause such an unconformity of combination of versions even if the CPU 210 determines that the update processing of program of the main partition 401 is successful.

The processing in a case where the sub-partition update program of the main partition 401 is executed is described below with reference to FIG. 5.

Each processing in FIG. 5 is started by the power supply of the information processing apparatus 100 being automatically turned on after the processing in FIG. 4 is ended and the information processing apparatus 100 is brought into the shut-off state.

In step S501, the CPU 210 causes the SRAM 227 to start the program of the main partition 401, confirms that the flag specifying the start in the update mode is stored therein, and starts the information processing apparatus 100 in the update mode. More specifically, the CPU 210 starts the OS 411 and the started OS 411 starts the sub-partition update program 421.

In step S502, the CPU 210 executes save processing for saving the program stored in the sub partition 402. More specifically, the save processing is performed by copying all programs stored in the sub partition 402 into the main partition 401. If the main partition 401 has an insufficient free space, the programs may be saved into the HDD 213. The reason the save processing is performed is that the program of the sub partition 402 can be restored to the state before the update is performed if an error occurs during the update processing.

In step S503, the CPU 210 executes the sub-partition update program 421 to execute the update processing of each program of the sub partition 402.

In step S504, the CPU 210 determines whether the update processing of each program of the sub partition 402 is successful. If the CPU 210 determines that the update processing is successful (YES in step S504), the processing proceeds to step S505. If the CPU 210 determines that the update processing is unsuccessful to cause an error (NO in step S504), the processing proceeds to step S506. The reason the update processing becomes unsuccessful to cause the error is that, for example, the update processing is not ended even after a certain time period elapses after the update processing is started.

In step S505, the CPU 210 starts the program of the main partition 401 at the next startup to store the flag specifying the start in the normal start mode into the SRAM 227.

Following step S505, the CPU 210 brings the information processing apparatus 100 into a stop state where the supply of electric power to each unit of the information processing apparatus 100 is shut off to reboot the information processing apparatus 100.

In step S506, the CPU 210 restores the programs of each processing unit using the program saved into the main partition 401 in step S502 because the update processing of the program is unsuccessful to cause an error in step S504. More specifically, the program saved into the main partition 401 is copied into the sub partition 402 to be restored.

The screen displayed on the operation unit 219 is described below with respect to FIGS. 6A to 6D.

Figure 6A:
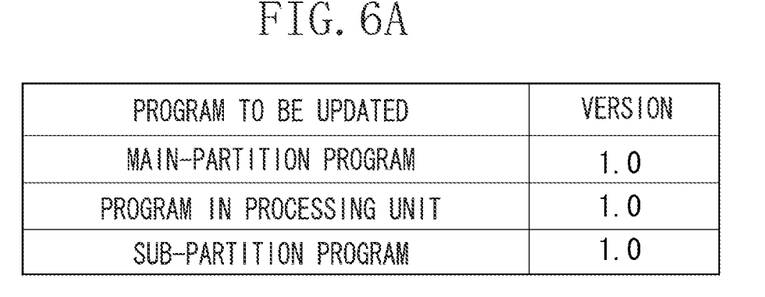
FIGS. 6A to 6D illustrate screens displayed on an operation unit.
Figure 6B:
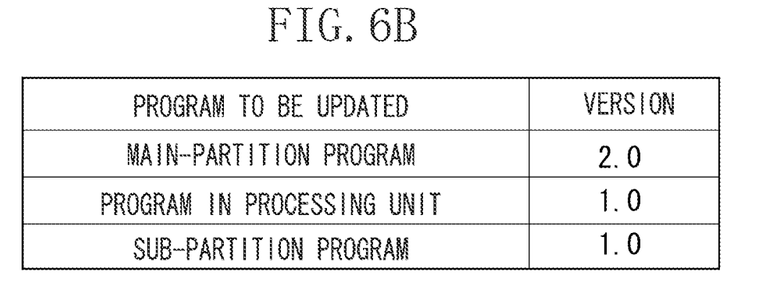
Figure 6C:
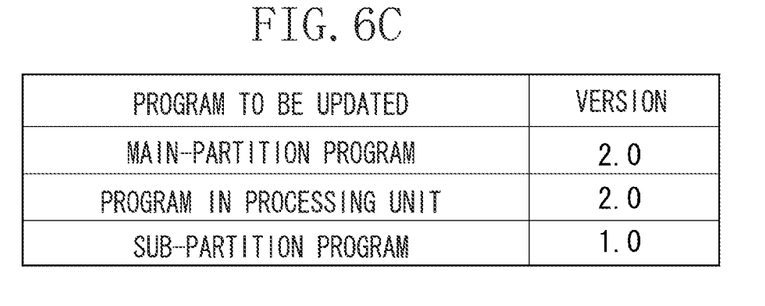
Figure 6D:
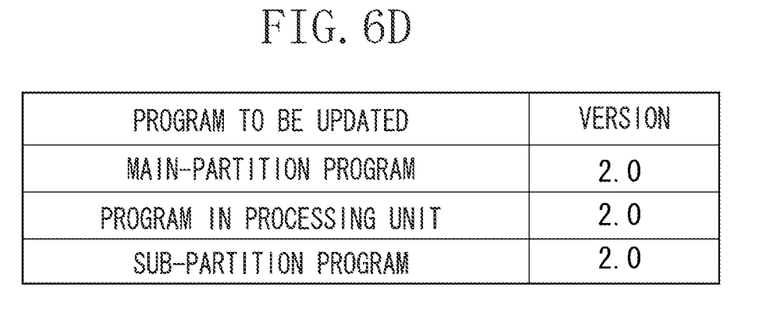

FIGS. 6A to 6C illustrate screens displayed on the operation unit 219 while the processing (the processing for updating the program of the main partition) is being executed according to the flow chart in FIG. 4. FIG. 6D illustrates a screen displayed on the operation unit 219 while the processing (the processing for updating the program of the sub partition) is being executed according to the flow chart in FIG. 5.

FIG. 6A illustrates a screen displayed in steps S401 and 402 in FIG. 4. The processing according to the flow chart in FIG. 4 is conducted to update the program identified as an object to be updated in the processing in FIG. 3. As illustrated in FIG. 6A, the screen displays the version of the program identified as an object to be updated in step S306 in FIG. 3. In FIG. 6A, the programs identified as objects to be updated are the main partition program, the processing-unit program, and the sub-partition program. FIG. 6A also illustrates that their respective versions are 1.0.

FIG. 6B illustrates a screen displayed in step S405 in FIG. 4. Step S405 is the processing executed in a case where the update processing is successful in step S404. The version of the main partition program is updated from 1.0 in FIG. 6A to 2.0 in FIG. 6B.

FIG. 6C illustrates a screen displayed in step S408 in FIG. 4. Step S408 is the processing executed in a case where the update processing is successful in step S407. The version of the processing-unit program is updated from 1.0 in FIG. 6A to 2.0 in FIG. 6B.

FIG. 6D illustrates a screen displayed in step S505 in FIG. 5. Step S505 is the processing executed in a case where the update processing is successful in step S504. The version of the sub-partition program is updated from 1.0 in FIG. 6A to 2.0 in FIG. 6C.

The main-partition program is restored in step S410 in FIG. 4 to switch the display screen in FIG. 6B to the display screen in FIG. 6A. This allows recognizing that the main-partition program is restored to change the version of the program from 2.0 to 1.0.

As described above, according to the present exemplary embodiment, there can be provided an information processing apparatus and a method for controlling the same which appropriately restore each program according to the state where each program is updated if an error occurs while a plurality of programs is being updated. More specifically, if an error occurs while the processing-unit program is being updated after the update of the main-partition program is finished, the processing-unit program which is being updated is restored to the program yet to be updated. The main-partition program whose update is finished is written back to the program yet to be updated. This avoids the problem that a combination of versions of programs of the main partition 401 and each processing unit is inappropriate.

Another exemplary embodiment of the present invention is described below. The present exemplary embodiment is a modification of the first exemplary embodiment and similar to the first exemplary embodiment except for the points described below.

In the first exemplary embodiment, in step S407 in FIG. 4, if the update processing for a program of at least any of the processing units among the programs of a plurality of processing units causes an error, the CPU 210 determines that the update processing is unsuccessful in step S407 and the CPU 210 restores the programs of all processing units.

On the other hand, in the present exemplary embodiment, the programs adaptable to the restored main-partition programs among the programs of the plurality of processing units are kept updated, i.e., not restored.

Figure 7:
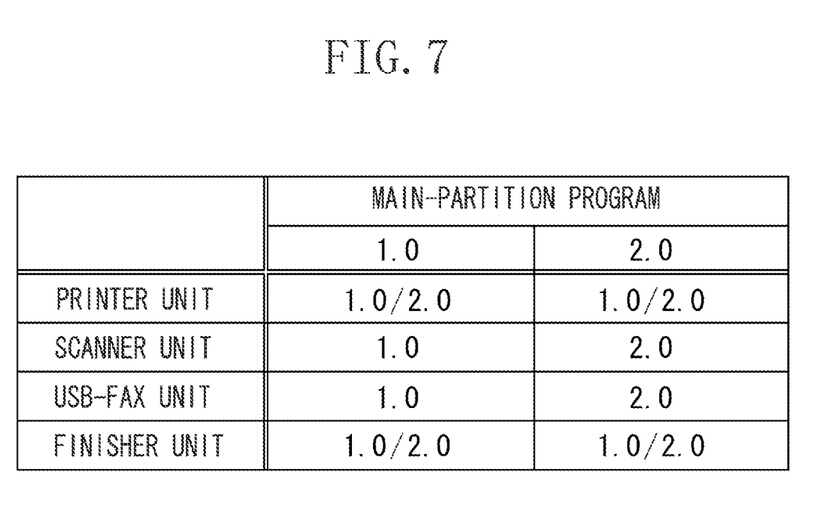
FIG. 7 illustrates a table for determining adaptability between the versions of programs.

A table for determining adaptability between the versions of the main-partition programs and those of programs of the processing units is described below with reference to FIG. 7. The table illustrated in FIG. 7 is stored in the main partition 401. The CPU 210 performs determination described below with reference to the table.

FIG. 7 shows that the versions 1.0 and 2.0 of program of the printer unit 220 are adaptable to the version 1.0 of the main-partition program. FIG. 7 also shows that the version 1.0 of program of the scanner unit 221 is adaptable to the version 1.0 of the main-partition program. FIG. 7 also shows that the version 1.0 of program of the USB-FAX unit 222 is adaptable to the version 1.0 of the main-partition program. FIG. 7 also shows that the versions 1.0 and 2.0 of program of the finisher unit 223 are adaptable to the version 1.0 of the main-partition program.

FIG. 7 shows that the versions 1.0 and 2.0 of program of the printer unit 220 are adaptable to the version 2.0 of the main-partition program. FIG. 7 also shows that the version 2.0 of program of the scanner unit 221 is adaptable to the version 2.0 of the main-partition program. FIG. 7 also shows that the version 2.0 of program of the USB-FAX unit 222 is adaptable to the version 2.0 of the main-partition program. FIG. 7 also shows that the versions 1.0 and 2.0 of program of the finisher unit 223 are adaptable to the version 2.0 of the main-partition program.

In the present exemplary embodiment, the processing in step S409 of the flow chart illustrated in FIG. 4 is executed as described below. When the processing in step S409 is executed, it is presumed that the version of the main-partition program is updated from 1.0 to 2.0.

In step S409 in FIG. 4, the CPU 210 determines which program among the programs of each processing unit is updated. For example, if the update processing of programs of the printer unit, the scanner unit, and the finisher unit is finished, but the update processing of program of the USB-FAX unit is not finished, the CPU 210 determines that the update processing in the printer unit, the scanner unit, and the finisher unit is finished. The CPU 210 confirms the versions (2.0) of the updated programs of the printer unit, the scanner unit, and the finisher unit and determines adaptability between the above versions and the version 1.0 of the main-partition program. In the example of FIG. 7, the CPU 210 determines that the version of the program of the printer unit is adaptable to that of the main-partition program and the versions of programs of the scanner unit and the finisher unit are not adaptable to that of the main-partition program. The reason the adaptability is determined with respect to the version 1.0 of the main-partition program is that the version of the main-partition program is restored from 2.0 to 1.0 in step S410.

The programs of the scanner unit and the finisher unit which are determined as unadaptable are restored by the programs of the scanner unit and the finisher unit saved in the sub partition 402 in step S405. More specifically, the program of the scanner unit saved in the sub partition 402 is copied into the flash ROM 221*b* of the scanner unit 221. The program of the finisher unit 222 saved in the sub partition 402 is copied into the flash ROM 222*b* of the finisher unit 222 to be restored.

As described above, according to the present exemplary embodiment, there can be provided an information processing apparatus and a method for controlling the same which appropriately restore each program according to the state where each program is updated if an error occurs while a plurality of programs is being updated.

More specifically, the program of the processing unit during the update processing is restored to the program yet to be updated if an error occurs while the program of the processing unit is being updated after the update of the program of the main partition is finished. The programs adaptable to the restored main-partition programs among the processing-unit programs whose update processing is finished are not restored. Therefore, only the programs unadaptable to the restored main-partition programs among a plurality of the processing-unit programs can be appropriately restored. Only the unadaptable programs are restored to enable preventing unnecessary restoration.

In the above description, update information is received from the server apparatus 225 via the network I/F 218, but another configuration may be used. For example, such a configuration may be used that a USB memory (an external memory) is connected via the USB-Host I/F 217 to receive the update information stored in the USB memory via the USB-Host I/F 217.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-154959 filed Jul. 7, 2010, which is hereby incorporated by reference herein in its entirety.

What is claimed is:

1. An information processing apparatus, comprising:
   a first memory configured to store a first program;
   a second memory configured to store a second program, wherein the second memory is different from the first memory;
   a save unit configured to save the first program and the second program as saved information;
   an update unit configured to update the first program and the second program based on update information; and
   a restoration unit configured to, in a case where the update of the first program is successful and the update of the second program is unsuccessful, restore the second program and the first program based on the saved information,
   wherein the updating of the second program is unsuccessful when the first program and the second program are unadaptable.

2. The information processing apparatus according to claim 1, further comprises:
   an acquisition unit configured to acquire the update information from an external apparatus.

3. The information processing apparatus according to claim 1, wherein
   the updating unit updates the first program, and then updates the second program in a case where the update of the first program is successful.

4. The information processing apparatus according to claim 3, wherein
   in a case where the update of the first program is unsuccessful, the restoration unit restores the first program without the updating unit updating the second program.

5. The information processing apparatus according to claim 1, wherein the information processing apparatus includes a first control unit having the first memory and a second control unit having the second memory.

6. The information processing apparatus according to claim 5, wherein
   the first control unit is a unit for controlling the information processing apparatus, and
   the second control unit is a printer unit.

7. The information processing apparatus according to claim 5, wherein
   the first control unit is a unit for controlling the information processing apparatus, and
   the second control unit is a finisher unit.

8. The information processing apparatus according to claim 5, wherein
   the first control unit is a unit for controlling the information processing apparatus, and
   the second control unit is a scanner unit.

9. The information processing apparatus according to claim 5, wherein
   the first control unit is a unit for controlling the information processing apparatus, and
   the second control unit is a USB-FAX unit.

10. The information processing apparatus according to claim 5, wherein
    the first program stored in the first memory is executed by a first CPU included in the first control unit, and
    the second program stored in the second memory is executed by a second CPU included in the second control unit.

11. The information processing apparatus according to claim 1, wherein a table is used in determining adaptability between the first and second programs.

12. A method comprising:
    storing a first program in a first memory;
    storing a second program in a second memory, wherein the second memory is different from the first memory;
    saving the first program and the second program as saved information;
    updating the first program and the second program based on update information; and
    in a case where the updating of the first program is successful and the updating of the second program is unsuccessful, restore the second program and the first program based on the saved information,
    wherein the updating of the second program is unsuccessful when the first program and the second program are unadaptable.

13. The method according to claim 12, wherein a table is used in determining adaptability between the first and second programs.

14. A computer readable storage medium storing a computer-executable program of instructions for causing a computer to perform a method, comprising:
    storing a first program in a first memory;
    storing a second program in a second memory, wherein the second memory is different from the first memory;

saving the first program and the second program as saved information;

updating the first program and the second program based on update information; and in a case where the updating of the first program is successful and the updating of the second program is unsuccessful, restore the second program and the first program based on the saved information, wherein the updating of the second program is unsuccessful when the first program and the second program are unadaptable.

15. The computer readable storage medium according to claim 14, wherein a table is used in determining adaptability between the first and second programs.

* * * * *